Patented May 23, 1939

2,159,377

UNITED STATES PATENT OFFICE 2,159,377

MAKING LOW VISCOSITY CELLULOSE ETHERS

Richard D. Freeman and Martin J. Roberts, Midland, Mich., assignors to The Dow Chemical Company, Midland, Mich., a corporation of Michigan No Drawing. Application July 19, 1938, Serial No. 220,134

9 Claims. (Cl. 260—212)

This invention relates to a method for the reduction of intrinsic solution viscosity of cellulose, and particularly to such a method whereby a low viscosity cellulose may be produced from which low viscosity cellulose ethers may be made.

Viscosity data herein are, in the case of cellulose, reported in two different forms. By the expression "1 per cent viscosity" is meant the viscosity of cellulose as measured on a 1 per cent solution by weight thereof in a cuprammonium hydroxide reagent containing 15 grams of copper and 200 grams ammonia per liter. The expression "3 per cent viscosity" refers to a viscosity measurement on a 3 per cent solution of the cellulose in a cuprammonium reagent containing 30 grams of copper and 200 grams of ammonia per liter. Viscosity measurements relating to cellulose ethers are reported herein based on determinations at 25° C. on 5 per cent solutions by weight of the cellulose ether in a solvent consisting of 80 parts of toluene and 20 parts of ethanol, by volume.

It has long been desired to obtain stable cellulose ethers having low intrinsic viscosity, and more especially such ethers which have viscosities lower than 20 centipoises. In the case of ethyl cellulose it has been desired to produce a material having a viscosity in the range from about 5 to 10 centipoises. Cellulose ethers in this viscosity range are not common, and such ethers as have been prepared falling in the above defined viscosity range have been unsatisfactory for many purposes owing to their instability toward heat and light or because of their brittleness which makes them inapplicable to a variety of possible commercial uses for such materials. Lower alkyl ethers of cellulose, among the most important of which is ethyl cellulose, have occasionally been prepared within the above mentioned desired viscosity range by methods involving either an aging of the alkali cellulose prior to etherification or reducing the viscosity of a cellulose ether by degradation of its molecule with acid, both processes producing ethyl cellulose in low yields. The process involving long time aging of alkali cellulose at elevated temperatures results invariably in the production of a large proportion of oxidation products in the alkali cellulose which then is etherified to a cellulose ether of poor heat stability and inferior color. The processes involving degradation of the cellulose ether molecule by means of acid hydrolysis have resulted invariably in a relatively unstable and brittle cellulose ether product.

It has long been known that the intrinsic solution viscosity of cellulose can be reduced by treating cellulose with dilute aqueous mineral acids. The use of concentrated mineral acids for the purpose has been avoided as far as possible because the effect of such acids is not limited to a reduction of the viscosity characteristics of the cellulose, but goes much further, producing in the end a completely water-soluble glucose material. The use of dilute mineral acids has its disadvantages as well. Such acids can be removed from cellulose only with difficulty and their effect upon the viscosity of the cellulose continues for considerable time after the cellulose has been removed from the acid bath. If not carefully controlled, the dilute mineral acids can saccharify cellulose as well as the more concentrated acids. Both dilute and concentrated mineral acids, and the aqueous vapors of such acids have been used to reduce the viscosity of cellulose, which has then been nitrated while still wet. To etherify cellulose, however, an alkali cellulose of certain specific water and alkali content must first be formed.

An aqueous acid can be used to reduce the intrinsic viscosity of cellulose to the desired level, and further viscosity reduction can be avoided by neutralizing the absorbed acid remaining on the cellulose. Such a product is not satisfactory since it contains too much water to yield an alkali cellulose of the type necessary to make the most useful water-insoluble cellulose ethers. A drying step, intended to reduce the water content of the cellulose to the requisite low value may be accompanied by undesirable degradation of the cellulose. In order to employ a cellulose which had been treated with aqueous acid, in a continuous etherification process, it would be necessary to re-felt the fibers into a sheet after the soaking and drying step. This would be difficult if not impossible, since the reduction of cellulose viscosity to the range required for producing cellulose ethers of the viscosity type herein described is usually accompanied by such a reduction in fiber length that the formation of a sheet from such fibers is difficult and, when formed, has very little strength. For these reasons, among others, little importance has been attached in the past to the possibility of reducing the intrinsic solution viscosity of cellulose in order to prepare a product adapted to the manufacture of low viscosity cellulose ethers, and as has previously been mentioned, such ethers have been prepared either by the aging of alkali cellulose prior to etherification or by acid hydrolysis of a high viscosity ether.

It is accordingly, among the objects of the present invention to provide a convenient, rapid process for producing a low viscosity cellulose adapted to the direct production of low viscosity alkali cellulose, and thence low viscosity cellulose ethers, without employing an aqueous acid, and without requiring aging of the alkali cellulose with its consequent oxidation and degradation of the cellulose molecule, or subsequent acid degradation of the cellulose ether. Other objects will appear as the description proceeds.

We have now found that the foregoing and related ends may be readily attained by pretreating cellulose in an air-dried condition and substantially at room temperature with anhydrous hydrogen chloride or other hydrogen halide, such as hydrogen bromide or hydrogen iodide. For convenience, the invention will be illustrated herein with respect to the use of anhydrous hydrogen chloride. After our pretreatment of air-dried cellulose with anhydrous hydrogen halide to the desired viscosity level, in a manner which will be more fully described hereinafter, we have found that further reduction of the cellulose viscosity can be completely avoided by subjecting the cellulose to a brief treatment with anhydrous ammonia. The so-treated and neutralized product can be kept indefinitely without subsequent alteration of the intrinsic viscosity, and whether stored for later use or utilized immediately in the preparation of alkali cellulose and then in the preparation of cellulose ethers, the ether product has a low viscosity, is obtained in good yields, and is stable toward light and elevated temperatures. If the cellulose is to be etherified immediately after the viscosity reduction, the acid therein can be neutralized with sodium hydroxide during the formation of alkali cellulose, instead of using gaseous ammonia, as described above. The alkali cellulose should be etherified immediately, without aging, in order to produce a stable, low viscosity cellulose ether capable of forming strong flexible films.

In a preferred mode of carrying out our invention, a sheet of cellulose fibers, either from wood pulp or from cotton, is passed continuously into and through a chamber wherein its is exposed to the action of anhydrous gaseous hydrogen chloride, preferably at or near room temperature. The cellulosic fiber aggregate being treated is preferably employed in the air-dried condition and ordinarily contains less than 10 per cent moisture based on the weight of cellulose present. The hydrogen chloride is absorbed during treatment by said residual moisture contained in the sheet and is uniformly distributed throughout the sheet. We have found that regardless of the conditions employed in this treatment, the ultimate concentration of hydrogen chloride in the cellulose-borne moisture never exceeds about 32–35 per cent.

A number of factors have been found which influence the final viscosity of the cellulose fibers and which must be controlled in order that the desired viscosity be obtained. These factors include: (1) the moisture content of the cellulose aggregate; (2) the rate of travel of this aggregate through the hydrogen chloride treating chamber or the duration of such treatment; (3) the amount of hydrogen chloride supplied to the treating chamber relative to the moisture content of the treated cellulose; (4) temperature to which the treated cellulose aggregate is subjected after passing through the hydrogen chloride chamber; and (5) the duration of any such aging step. When factors (2) and (3) are maintained constant while treating two different cellulose aggregates having different moisture contents, it is found that the greater the quantity of moisture existing in the air-dry cellulosic sheet the greater is the amount of gaseous hydrogen chloride absorbed in said moisture per unit weight of oven-dry cellulose. To illustrate this point, reference is made to the following table showing the amount of hydrogen chloride required to effect saturation of the moisture in two different cellulose samples under otherwise identical conditions:

| Sample No. | Percent moisture | Percent HCl based on weight of cellulose | Percent HCl based on weight of water present |
|---|---|---|---|
| 1 | 2.50 | 0.75 | 30.0 |
| 2 | 5.87 | 1.87 | 31.8 |

These results show that with increased moisture content there is a corresponding increase in the weight of hydrogen chloride retained by the cellulose. The table bears out further the statement previously made that regardless of the moisture content of the cellulose the amount of hydrogen chloride absorbed remains substantially constant with relation to the amount of moisture present in the cellulose.

The moisture content of air-dried cellulose varies directly as the relative humidity of the atmosphere in which it has been stored. In particularly humid climates it may be desirable to effect a partial drying of the cellulose prior to gas treatment to be able to produce a particular set of viscosity conditions in the cellulose prior to etherification. In particularly arid climates it may be necessary to employ mechanical means to increase the moisture content of the cellulose to the desired level, i. e. up to 5–10 per cent, prior to treatment with the hydrogen halide.

When the cellulose employed is conveyed through the treating chamber, in the form of a sheet which will support its own weight, or as an unformed aggregate spread suitably on a belt or screen conveyor, an increase in the speed at which such sheet or aggregate passes through the gas chamber results in a lower absorption of hydrogen chloride on the cellulose. For example, a sample of cellulose having a normal air-dry moisture content of 5 per cent was passed through a treating chamber at a speed of 6 feet per minute while the hydrogen chloride was supplied to the six-foot long chamber at the rate of 14 cubic feet per minute. The amount of absorbed hydrogen chloride based on the weight of cellulose was just under 3 per cent. When, however, the rate of passage of the cellulose sheet through the treating chamber was increased to 12 feet per minute, the amount of hydrogen chloride retained decreased to about 1.5 per cent.

It is only necessary to supply to the treating chamber sufficient hydrogen chloride to saturate the small amount of moisture in the pulp passing through the chamber. On account of possible slight variations in the moisture content of the commercial sheet of cellulosic pulp or cotton fibers, it is our practice to supply slightly more hydrogen chloride than is necessary to effect saturation. Maintenance of this condition may be assured by supplying sufficient hydrogen chloride to the chamber so that there is always some hydrogen chloride effluent from the chamber.

Viscosity reduction of the cellulose in the aggregate being treated may not be effected instantaneously to the desired extent. In order to reduce the viscosity of the cellulose to a value such that it may be employed in the preparation of the aforementioned type of low viscosity cellulose ethers, an aging step is employed. This step may be carried out either in the hydrogen chloride treating chamber or preferably in a closed vessel capable of being heated to temperatures up to about 75° to 80° C. The expression "aging"

herein employed is the term applied to the interval in which the pulp is allowed to stand in contact with the hydrogen chloride absorbed therein to bring about viscosity reduction and is to be distinguished from aging of alkali cellulose. It has been found that the cellulose viscosity decreases with increased time or temperature of aging, other factors being constant. It is ordinarily not necessary to age the acid-gas-treated cellulose for more than about 10 hours, and in most cases from ½ hour to 6 hours aging is sufficient at room temperature, or about ½ minute to 15 minutes at 75° to 80° C. Certain high viscosity celluloses require somewhat longer treatment. After such an aging treatment the intrinsic viscosity of the cellulose is such that, when converted to alkali cellulose and immediately etherified, the cellulose ethers made therefrom are of the desired low viscosity type. We ordinarily prefer to reduce the one per cent cellulose viscosity by at least one-half. To illustrate, the following table gives the original and the reduced viscosities of several cellulose samples from which the desired type of ether was produced by our method.

| Cellulose sample | Original 1% viscosity, centipoises | Reduced viscosity from which desired ethers may be prepared |
|---|---|---|
| | | Cps. |
| A | 28 | 11-3 |
| B | 15 | 3-6 |
| C | 60 | 15-17 |
| D | 25 | 9 |

After the hydrogen halide treatment and the aging step have cooperated to produce a cellulose having an intrinsic viscosity in the desired range, it may prove undesirable or inconvenient to convert the cellulose immediately to alkali cellulose and thence to the cellulose ether. If the cellulose is allowed to stand in contact with residual adsorbed or absorbed hydrogen halide, the viscosity of the cellulose will continue to drop, and, if allowed to stand long enough, a hydrolyzed product will be obtained which is unsuited to the present use. If, however, the HCl-treated cellulose is treated with gaseous ammonia as soon as the viscosity has been reduced to the desired level, the amount of ammonia being sufficient to neutralize all remaining hydrogen chloride, there is no further viscosity reduction, and the cellulose may be stored indefinitely prior to etherification, without degradation or further viscosity reduction. To illustrate, two samples of air-dry cellulose pulp were each treated for equal lengths of time with hydrogen chloride gas as herein-described, and one of the samples was stored without neutralizing its acid content, while the other was neutralized with gaseous ammonia prior to storage. Viscosity measurements before and after storage are given below:

| Sample | Treatment | 3% viscosity | | Time of storage |
| | | Before storage | After storage | |
|---|---|---|---|---|
| 1 | Not neutralized | 36.6 | 26.8 | 8 hours |
| 2 | Neutralized—NH₃ | 43 | 43 | 9 days |

It is observed that there was a rapid change in the viscosity of the sample which was not neutralized, while the ammonia-treated sample did not change in viscosity after several days.

If the low viscosity cellulose is to be etherified immediately after the hydrogen chloride treatment, the residual hydrogen chloride may be neutralized with gaseous ammonia and the cellulose at once converted to alkali cellulose, or the cellulose may be converted directly to alkali cellulose, either by immersion in an alkaline bath or by shredding or macerating the cellulose in the presence of sodium hydroxide and water in the desired proportions. For most purposes, the most satisfactory ethers are obtained from an alkali cellulose containing from 0.6 to 2.0 parts of water, and from 1.0 to 4.0 parts of sodium hydroxide per part of cellulose. The alkali cellulose should not be aged, as this will result in degradation and oxidation of the molecule, and make impossible the formation of stable cellulose ethers. As soon as the alkali cellulose is uniform in composition, it should be shredded or otherwise disintegrated, and etherified.

In a continuous process, the air-dry cellulose, in sheet form, is unwound from a roll and passed continuously through a chamber wherein it is treated with anhydrous hydrogen chloride, thence through a heated zone where further reduction in viscosity occurs, as mentioned above, in a step which corresponds in effect to an aging step, and from this zone into a chamber wherein the hydrogen chloride is neutralized, preferably with anhydrous ammonia. The hydrogen chloride treatment ordinarily requires from 0.5 to 3 minutes, the aging at 75° to 80° C. ordinarily requires less than 15 minutes in order to bring the viscosity below one-half of its original value, and the ammonia treatment requires from about 0.5 to 5 minutes. The total time required for a complete viscosity reduction and neutralization treatment, in a continuous process, is in the order of 20 minutes, or less. We consider the most satisfactory method of converting the cellulose to alkali cellulose to be substantially that described by Collings et al. in a co-pending United States patent application, Serial No. 144,374, filed May 24, 1937, in the following manner:

The still moving sheet of low viscosity cellulose is conducted into a bath of liquid sodium hydroxide, suitably of 60 to 80 per cent concentration, and at a temperature such that the alkaline solution remains liquid. The rate of travel of the cellulose sheet through the alkaline bath is adjusted so that the emerging sheet is just wet throughout but contains no excess sodium hydroxide solution. Under such conditions, the sheet will be found to have absorbed from 1.25 to about 3.2 times its weight of the alkaline solution. The so-formed alkali cellulose is disintegrated, preferably in a continuous shredder, and, without further delay, is placed in a reaction vessel where it is reacted with a suitable etherifying agent, such as an alkyl or aralkyl halide, an alkyl sulphate, or other suitable etherifiant.

The following examples illustrate the practice of our invention:

*Example 1*

A sheet of air-dry cellulose pulp having a moisture content of about 5 per cent was unwound from a roll and passed continuously into and through a chamber into which hydrogen chloride gas was being introduced. The rate of travel of the cellulose through the treating chamber was such that the cellulose remained in the atmosphere of hydrogen chloride for about one minute. The hydrogen chloride was introduced at the same end of the chamber as the pulp and at a rate of about 4 liters per minute. Any excess hydrogen chloride over that required to keep the atmosphere saturated with hydrogen chloride was withdrawn from the same end of the chamber as that at which the cellulose was removed. The hydrogen chloride treatment was carried out at room temperature. When the cellulose was withdrawn from the treating chamber, it was again wound into a roll to keep the hydrogen chloride therein, and set aside for about ½ hour, after which time it was unwound and passed at a uniform rate through another chamber in which it was treated with dry ammonia gas supplied to the chamber at the rate of about 4 liters per minute. The rate of passage through the ammonia chamber was such that the treatment required about 1½ minutes. Excess ammonia was withdrawn from the ammonia chamber in the same manner as was hydrogen chloride in the previous treating step. The neutralized pulp was again formed into rolls and stored for a period of about 4 days until needed in the preparation of cellulose ethers. The original pulp had a one per cent viscosity of 28 centipoises and the HCl-ammonia treated pulp had a viscosity of 10.4 centipoises prior to storage. After having been stored for 4 days, the cellulose still had a one per cent viscosity of 10.4 centipoises.

*Example 2*

A sheet of cellulosic material was treated in a manner analogous to that set forth in the preceding example with the exception that the rate of travel of the cellulose sheet through the hydrogen chloride and the ammonia treating chambers was such that the period of contact between the cellulose and each of the treating gases was 3 minutes. The original cellulose was the same as that previously employed, having a one per cent viscosity of 28 centipoises. The treated cellulose had a one per cent viscosity of 6.84 centipoises or a 3 per cent viscosity of about 75 centipoises. The so-treated cellulose was then subjected to disintegration in a Baker-Perkins shredder and the shredded product was treated with sodium hydroxide and water in amounts sufficient to give an alkali cellulose having an alkali:cellulose ratio of 2.2:1 and a water:cellulose ratio of 0.6:1. The alkali cellulose was shredded for 20 minutes at 65° C. The cellulose in the alkali cellulose at this point had a 3 per cent viscosity of 8.3 centipoises. 3.8 pounds of this material and 8 pounds of ethyl chloride were heated in a closed pressure vessel to a temperature between 110° and 120° C. for about 8 hours. The so-formed ethyl cellulose was removed from the reactor, freed from excess ethyl chloride and from the alcohol and ether formed as by-products during the reaction and was analyzed to determine its chemical and physical properties.

*Ethyl cellulose properties*

| | |
|---|---|
| Viscosity | 9.6 centipoises |
| Ethoxyl content | 48.6 per cent |
| Stability (heated in air for 50 minutes at 170° C | 83 per cent |
| Tensile strength | 395 kilograms per square centimeter |
| Elongation | 3.6 per cent |

*Example 3*

In order to compare the properties of low viscosity ethyl cellulose producible from HCl-ammonia-treated cellulose with those of an ethyl cellulose obtained from an alkali cellulose prepared in the ordinary manner and subsequently subjected to high temperature aging to reduce its viscosity, the following experiments were carried out. A series of samples of the same type of cellulose as that employed in the preceding examples were subjected to the hydrogen chloride and subsequent ammonia treatment in a manner analogous to that set forth in Examples 1 and 2. The average one per cent viscosity of the cellulose following such treatment varied from 5.0 to 8.3 centipoises. A similar series of cellulose samples was treated with sodium hydroxide of about 70 to 75 per cent concentration without any previous hydrogen chloride treatment and the so-formed alkali cellulose was aged at a temperature above its hardening point, i. e. at a temperature of about 55° to about 75° C., until the one per cent viscosity of the cellulose in the alkali cellulose was from 4.0 to 5.0 centipoises. The samples of acid-treated cellulose were converted to alkali cellulose by reaction with the same type of sodium hydroxide as was employed in the case of the non-acid-treated samples. The cellulose in this alkali cellulose varied from about 4.0 to 5.0 centipoises in viscosity (one per cent). Both types of alkali cellulose were etherified using ethyl chloride under substantially identical reaction conditions. The ethyl cellulose produced from the hydrogen chloride-treated cellulose had a viscosity of about 3 centipoises while that produced from the aged alkali cellulose had a viscosity varying from 5 to 6 centipoises. A further contrast was observed between the properties of these materials. The hydrogen chloride-treated cellulose gave ethyl cellulose having greater tensile strength and greater elongation without rupture than did the aged alkali cellulose. This indicates that the customary long time and high temperature aging of alkali cellulose to reduce the intrinsic viscosity of the cellulose therein is accompanied by oxidation which results in the formation of less stable products than can be obtained by the herein-described process. The stability of the ethyl cellulose produced from hydrogen chloride-treated cellulose was from 10 to 20 per cent greater for the same viscosity type of material than that of ethyl cellulose produced according to the customary method involving aging of alkali cellulose. The expression "stability" herein employed with respect to cellulose ethers refers to the per cent of the original intrinsic viscosity of a cellulose ether which is retained after a sample thereof is subjected to a temperature of 170° C. in the presence of air for 50 minutes.

*Example 4*

The following experiments were carried out to ascertain the effect of the present process upon the physical characteristics of cellulose ethers prepared thereby in comparison with the corresponding properties of cellulose ethers prepared from aged alkali cellulose in the customary manner. A sample of cellulose in sheet form was subjected to the hydrogen chloride treatment at room temperature and the HCl-containing sheets were aged in a closed vessel for 6 hours at 60°–65° C. The one per cent viscosity of the original cellulose was 28 centipoises while that of the aged cellulose was 3.2 centipoises. The 3 per cent viscosity of the acid-treated, aged cellulose was 11 centipoises. A portion of the so-treated, low viscosity cellulose was shredded in a Baker-Perkins shredder with a mixture of solid sodium hydroxide and 50 per cent sodium hydroxide solution in proportion sufficient to give an alkali cellulose having an alkali:cellulose ratio of 2.0:1 and a water:cellulose ratio of 0.5:1. Shredding required 10 minutes in which to produce a uniform product. The 3 per cent viscosity of alkali cellulose was 7.6 centipoises.

A sample of the same type of cellulose as had been employed in the foregoing experiment was mixed with 50 per cent sodium hydroxide solution and sufficient solid sodium hydroxide to produce an alkali cellulose having the same approximate alkali:cellulose and water:cellulose ratios as those given above for the low viscosity alkali cellulose. The alkali cellulose thus prepared from a regular high viscosity cellulose pulp was aged at about 65° C. until the viscosity of the alkali cellulose was about 6 centipoises.

Both samples of alkali cellulose, i. e. the one prepared from low viscosity cellulose and that which had been aged to reduce the cellulose viscosity, were etherified under substantially identical reaction conditions employing an excess of ethyl chloride over that required to produce the desired form of ethyl cellulose and when the reaction was complete, the ethyl cellulose was recovered from each reaction vessel, freed from salt and similar impurities, dissolved to form standard solutions in a mixture of 80 parts of toluene and 20 parts of ethanol by volume and physical properties were determined thereon. The ethyl cellulose prepared according to the present invention had a viscosity of 4.1 centipoises, formed films having tensile strength of 375 kilograms per square centimeter of original cross section and was capable of elongation to the extent of 3 per cent. The ethyl cellulose produced according to the usual procedure wherein alkali cellulose is aged in order to reduce the cellulose viscosity had a viscosity of 3.7 centipoises, a tensile strength of only 246 kilograms per square centimeter, and was capable of 1.3 per cent elongation. The foregoing comparison shows the desirability of employing the herein-described process for the production of stronger, more flexible, and hence more useful, low viscosity cellulose ethers.

We have found that the herein-described process yields low viscosity cellulose ethers which are characterized not only by good tensile strength and by being capable of greater elongation than those ordinarily prepared but also that such cellulose ethers contain less foreign matter which is likely to discolor the same when dissolved in the ordinary solvents for such materials.

The herein-described invention, then, has among others the following advantages: Our process provides a convenient and accurate means of controlling the reduction of the viscosity of cellulose in such a manner that low viscosity cellulose derivatives such as cellulose ethers may be formed therefrom without the necessity for intervening steps of aging alkali cellulose or of degrading the high viscosity type cellulose ether. The acid-treated cellulose may be converted immediately, to a useful alkali cellulose, if desired, no intermediate drying step being required. The process furnishes a means of storing an acid-treated, low viscosity cellulose without danger of further reduction of viscosity during storage.

Other modes of applying the principle of our invention may be employed instead of those explained, change being made as regards the process herein disclosed, provided the step or steps stated by any of the following claims or the equivalent of such stated step or steps be employed.

We therefore particularly point out and distinctly claim as our invention:—

1. The process which comprises subjecting an aggregate of air-dry cellulose fibers to the action of anhydrous gaseous hydrogen halide under such conditions that the moisture content of the cellulose becomes substantially saturated with respect to said hydrogen halide, maintaining the cellulose and hydrogen halide in contact with one another to effect a reduction in the intrinsic solution viscosity of the cellulose and subjecting the acid-treated cellulosic aggregate to the action of substantially anhydrous ammonia, whereby the remaining acid is neutralized and the cellulose is stabilized against further viscosity reduction.

2. The process which comprises subjecting an aggregate of air-dry cellulose fibers to the action of anhydrous gaseous hydrogen chloride under such conditions that the moisture content of the cellulose becomes substantially saturated with respect to said hydrogen chloride, maintaining the cellulose and hydrogen chloride in contact with one another to effect a reduction in the intrinsic solution viscosity of the cellulose and subjecting the acid-treated cellulosic aggregate to the action of substantially anhydrous ammonia, whereby the remaining acid is neutralized and the cellulose is stabilized against further viscosity reduction.

3. The process which comprises subjecting an aggregate of air-dry cellulosic fibers to the action of anhydrous gaseous hydrogen halide under such conditions that the residual moisture content of the cellulose becomes substantially saturated with respect to said hydrogen halide, allowing the cellulose and thereon absorbed hydrogen halide to remain in contact with one another until the one per cent viscosity of the cellulose has been reduced by at least one-half, and thereafter immediately subjecting the acid-treated cellulosic aggregate to the action of substantially anhydrous ammonia, whereby the remaining acid is neutralized and the low viscosity cellulose is stabilized against further viscosity reduction.

4. The continuous process which comprises the steps of passing an air-dry cellulosic fiber mass into and through a chamber wherein it is subjected to the action of anhydrous gaseous hydrogen chloride in quantity substantially sufficient to saturate the moisture content of the cellulose with hydrogen chloride, aging the so-treated aggregate, the duration of the aging treatment varying inversely as the temperature employed, and being in the range between ½ hour to 6 hours when the aging is conducted at room temperature and about ½ minute to 15 minutes when the aging temperature is between 75° and 80° C. and thereafter subjecting the acid-containing, low viscosity aggregate to the action of anhydrous gaseous ammonia in quantity sufficient to neutralize the acid remaining in the cellulose.

5. The process which comprises subjecting an aggregate of air-dry cellulose fibers to the action of anhydrous hydrogen chloride under such conditions that the moisture content of the cellulose becomes substantially saturated with respect to hydrogen chloride, maintaining the cellulose and hydrogen chloride in contact with one another to effect a substantial reduction in the intrinsic solution viscosity of the cellulose, thereupon neutralizing the thereon absorbed hydrogen chloride with gaseous ammonia, converting the neutral, low viscosity cellulose to alkali cellulose, and immediately thereafter etherifying the alkali cellulose to form a stable, low viscosity cellulose ether.

6. The process which comprises subjecting an aggregate of air-dry cellulose fibers to the action of anhydrous hydrogen chloride under such conditions that the moisture content of the cellulose becomes substantially saturated with respect to hydrogen chloride, maintaining the cellulose and hydrogen chloride in contact with one another to effect a reduction in the one per cent viscosity of the cellulose by at least one-half, thereupon neutralizing the thereon absorbed hydrogen chloride with gaseous ammonia, converting the neutral, low viscosity cellulose to alkali cellulose, and immediately thereafter etherifying the alkali cellulose to form a stable, low viscosity cellulose ether.

7. The process which comprises subjecting an aggregate of air-dry cellulose fibers to the action of anhydrous hydrogen chloride under such conditions that the moisture content of the cellulose becomes substantially saturated with respect to hydrogen chloride, maintaining the cellulose and hydrogen chloride in contact with one another to effect a reduction of the viscosity of the cellulose to such an extent that, when converted to alkali cellulose and etherified, the ether has a viscosity below 20 centipoises thereupon neutralizing the thereon absorbed hydrogen chloride with gaseous ammonia, converting the neutral low viscosity cellulose to alkali cellulose, and immediately thereafter etherifying the alkali cellulose, whereby there is formed a stable cellulose ether having a viscosity beow 20 centipoises, as determined at 25° C. on a 5 per cent solution thereof in a mixture of 80 parts of toluene and 20 parts of ethanol by volume.

8. The process which comprises subjecting an aggregate of air-dry cellulose fibers to the action of anhydrous hydrogen chloride under such conditions that the moisture content of the cellulose becomes substantially saturated with respect to hydrogen chloride, subjecting the cellulose and thereon absorbed hydrogen chloride to an aging treatment which is equivalent in effect to the results obtained by raising the temperature of the acid-treated cellulose to from 75° to 80° C. for from ½ minute to 15 minutes, thereupon neutralizing the thereon absorbed hydrogen chloride with gaseous ammonia, converting the neutral low viscosity cellulose to alkali cellulose, and immediately etherifying the alkali cellulose, to form a stable cellulose ether whose standard solution has a viscosity below about 10 centipoises.

9. The process which comprises the steps of passing an air-dry cellulosic fiber sheet into and through a chamber wherein it is subjected to the action of sufficient anhydrous hydrogen chloride to substantially saturate the moisture content of the cellulose with hydrogen chloride, aging the sheet, the duration of the aging treatment varying inversely as the temperature employed, and being in the range between ½ hour to 6 hours when the aging is conducted at room temperature and about ½ minute to 15 minutes when the aging temperature is between 75° and 80° C., passing the sheet of low viscosity cellulose into and through a bath of liquid sodium hydroxide of from 60 to 80 per cent concentration at a temperature such that the sodium hydroxide bath remains liquid, at such a rate that the sheet emerges from the bath as soon as it is just wet throughout with the sodium hydroxide solution and contains an amount of said solution equivalent to from about 1.25 to 3.2 times the weight of the cellulose, thereupon immediately shredding the alkali cellulose sheet and etherifying the shredded alkali cellulose, to form a stable, low viscosity cellulose ether.

RICHARD D. FREEMAN.
MARTIN J. ROBERTS.